United States Patent
Kalyanaraman et al.

(10) Patent No.: US 8,533,220 B2
(45) Date of Patent: Sep. 10, 2013

(54) RETRIEVING DATA IN BATCHES FROM A LINE OF BUSINESS SYSTEM

(75) Inventors: Karthik Kalyanaraman, Bellevue, WA (US); Arshish Cyrus Kapadia, Issaquah, WA (US); Tarkan Sevilmis, Redmond, WA (US); Nazeeruddin Mohammed, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 12/416,940

(22) Filed: Apr. 2, 2009

(65) Prior Publication Data
US 2010/0257194 A1  Oct. 7, 2010

(51) Int. Cl.
*G06F 17/30* (2006.01)
(52) U.S. Cl.
USPC ............................................... 707/770
(58) Field of Classification Search
None
See application file for complete search history.

(56) References Cited

U.S. PATENT DOCUMENTS

| | | | |
|---|---|---|---|
| 6,275,820 B1 * | 8/2001 | Navin-Chandra et al. ............. | 1/1 |
| 6,289,252 B1 * | 9/2001 | Wilson et al. ...................... | 700/7 |
| 6,615,253 B1 * | 9/2003 | Bowman-Amuah .......... | 709/219 |
| 6,636,242 B2 * | 10/2003 | Bowman-Amuah .......... | 715/764 |
| 6,836,689 B2 * | 12/2004 | Walser et al. ................. | 700/100 |
| 7,085,803 B1 * | 8/2006 | Shisler et al. ................. | 709/201 |
| 7,152,090 B2 | 12/2006 | Amirisetty et al. | |
| 7,188,105 B2 * | 3/2007 | Dettinger et al. ..................... | 1/1 |
| 2001/0018708 A1 * | 8/2001 | Shisler et al. ................. | 709/220 |
| 2003/0131339 A1 * | 7/2003 | Kulkarni et al. .............. | 717/106 |
| 2004/0143644 A1 * | 7/2004 | Berton et al. .................. | 709/217 |
| 2005/0033726 A1 * | 2/2005 | Wu et al. ............................ | 707/1 |
| 2005/0228803 A1 | 10/2005 | Farmer et al. | |
| 2005/0256826 A1 * | 11/2005 | Hambrick et al. ................. | 707/1 |
| 2005/0257139 A1 | 11/2005 | Burst et al. | |
| 2005/0262087 A1 * | 11/2005 | Wu et al. ............................ | 707/9 |
| 2006/0004707 A1 * | 1/2006 | Dettinger et al. ................. | 707/3 |
| 2006/0122993 A1 * | 6/2006 | Dettinger et al. ................. | 707/4 |
| 2006/0195476 A1 | 8/2006 | Nori et al. | |
| 2006/0235836 A1 * | 10/2006 | Dettinger et al. ................. | 707/4 |
| 2007/0022093 A1 * | 1/2007 | Wyatt et al. ....................... | 707/2 |
| 2007/0106933 A1 | 5/2007 | Nene et al. | |
| 2008/0082569 A1 | 4/2008 | Mansour et al. | |
| 2008/0189240 A1 * | 8/2008 | Mullins et al. .................... | 707/2 |
| 2008/0195651 A1 | 8/2008 | Rachmiel et al. | |
| 2008/0209392 A1 * | 8/2008 | Able et al. ..................... | 717/105 |
| 2010/0153542 A1 * | 6/2010 | Arimilli et al. ............... | 709/224 |

OTHER PUBLICATIONS

Dietmar W. Erwin, "UNICORE—a Grid computing environment," Concurrency and Computation: Practice and Experience, John Wiley & Sons, Ltd., 2002; vol. 14: pp. 1395-1410.*
"Business Data Catalog: Architecture", Retrieved at <<http://msdn.microsoft.com/en-us/library/ms499729.aspx>>, Feb. 2, 2009, pp. 7.

(Continued)

*Primary Examiner* — Fred I Ehichioya
*Assistant Examiner* — Richard Bowen
(74) *Attorney, Agent, or Firm* — Merchant & Gould PC

(57) ABSTRACT

A line of business data integration ("LOBI") stack is provided that is configured to store an abstract representation of a mechanism utilized by a line of business ("LOB") system to return requested LOB data in batches. When a request is received from a client for the LOB data, the LOBI stack utilizes the abstract representation to retrieve the requested LOB data from the LOB system in batches. In this manner, the batching mechanism utilized by the LOB system is abstracted from the client.

20 Claims, 7 Drawing Sheets

(56) References Cited

OTHER PUBLICATIONS

Bellware, Scott, "Object-Relational Persistence for .NET", Retrieved at <<http://www.15seconds.com/Issue/040112.htm>>, Feb. 2, 2009, pp. 22.

"Business Data Catalog", Retrieved at <<http://blogs.msdn.com/sharepoint/archive/2006/04/18/578194.aspx>>, Feb. 2, 2009, pp. 16.

"Oracle Ultra Search", Retrieved at <<http://www.oracle.com/technology/products/ultrasearch/datasheet/UltraSearch_10gR1_DSheet.pdf>>, pp. 7.

Chervenak, et al., "A Metadata Catalog Service for Data Intensive Applications", Retrieved at <<http://www.isi.edu/~deelman/mcs_submitted_to_sc03.pdf>>, pp. 13.

* cited by examiner

RETRIEVING DATA IN BATCHES FROM A LINE OF BUSINESS SYSTEM

BACKGROUND

A line of business data integration ("LOBI") stack enables access to data contained in disparate line of business ("LOB") systems through a common mechanism. A typical LOBI stack provides an abstract representation of LOB data and the operations that may be performed on the data. Such a stack also typically includes a mapping language, such as the extensible markup language ("XML"), for mapping LOB objects, their metadata, and their access methods into the abstract representation provided by the stack. A runtime object model is also typically provided by the LOBI stack that uses the mapping metadata to execute the LOB methods and to present returned LOB data to clients of the LOBI stack in a homogeneous fashion regardless of the back end LOB system the data originated from.

Some methods in LOB systems are bulk operations that can return several thousand or even potentially several million records. Returning this volume of data in a single response may not be feasible especially over ubiquitous transports like the Hypertext Transfer Protocol ("HTTP"). In order to address this issue, many LOB systems provide functionality for returning a large data set by returning smaller portions of the data set, referred to herein as batches, in multiple request/response exchanges. For instance, in one example, an application programming interface ("API") is provided by a LOB system that can be invoked repeatedly by passing a page size and a page number to the API as parameters until no data is returned. Each LOB system may, however, utilize a different technique to batch large volumes of data. As a result, in order to interact with multiple LOB systems to retrieve batches of data, each consumer of LOB data, referred to herein as a client, must be programmed with custom LOB system specific code for each type of LOB system from which data is to be retrieved. Programming each client in this manner can be a complicated and expensive process.

It is with respect to these and other considerations that the disclosure made herein is presented.

SUMMARY

Technologies are described herein for retrieving data in batches from a LOB system. In particular, through an implementation of the embodiments presented herein, the mechanism utilized by a LOB system to batch data can be abstractly defined. A LOBI stack also exposes a standard interface for obtaining data from a LOB system. When the LOBI stack receives a request from a client for data stored at a LOB system, the LOBI stack utilizes the abstract representation of the batching mechanism to obtain the data from the LOB system. In this manner, the mechanisms utilized by LOB systems to batch data are abstracted from clients. As a result, the clients can be configured for use with the LOBI stack rather than for use with each LOB system from which data is to be retrieved.

According to one implementation, a LOBI stack is provided that is configured to store an abstract representation of a mechanism utilized by one or more LOB systems to return requested LOB data in batches. In one embodiment, the abstract representation is metadata defining parameters utilized by the LOB system to return requested LOB data in batches. The metadata defines filters utilized by the LOBI stack and parameters expected by the LOB system. A mapping between the filters and the parameters is also provided in the abstract representation.

The LOBI stack also exposes a standard interface for obtaining data from a LOB system. When the LOBI stack receives a request on the interface from a client for LOB data, the LOBI stack utilizes the abstract representation to retrieve the requested LOB data from the LOB system in batches and provides the requested LOB data to the client in response to the request. In one embodiment, the LOBI system retrieves the abstract representation, identifies the parameters based upon the abstract representation, and utilizes the parameters to create a request to the LOB system for a first batch of data.

The LOBI stack then receives a response to the request from the LOB system that includes a batch of data and one or more return parameters. The LOBI stack returns the batch of data to the requesting client and determines whether additional batches are available from the computing system based upon the return parameters. If additional batches are available, the LOBI stack creates a new request to the LOB system for an additional batch of data. This process may be repeated until no further data is available from the LOB system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
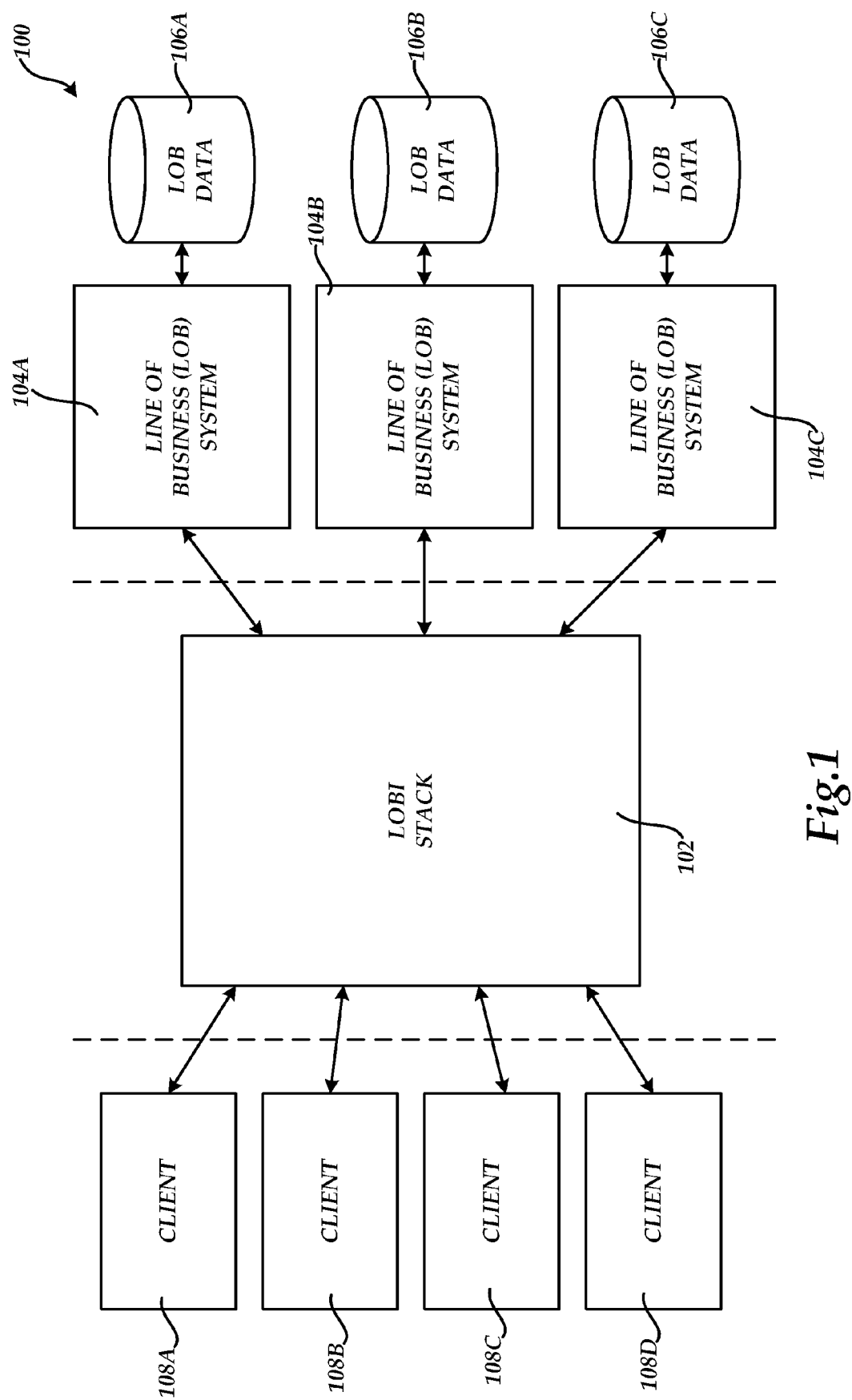
FIGS. 1-3 are computer architecture diagrams showing aspects of one illustrative operating environment for the embodiments presented herein.

The following detailed description is directed to technologies for retrieving data in batches from LOB systems. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for retrieving data in batches from LOB systems will be described.

Turning now to FIG. 1, details will be provided regarding an illustrative operating environment for the embodiments presented herein. In particular, FIG. 1 shows aspects of a LOBI stack 102 and several related components. The LOBI stack 102 is one or more software components that together store information about the LOB systems 104A-104C and the LOB data 106A-106C that they maintain. The LOBI stack 102 also enables the clients 108A-108D to use the stored information to access and utilize the LOB data 106A-106C in a standard manner. It should be appreciated that the LOB systems 104A-104C comprise computing systems that provide functionality for storing and exposing business data. Examples of LOB systems include, but are not limited to, database systems, e-mail systems, and customer relationship management ("CRM") systems.

According to embodiments, the LOBI stack 102 includes a metadata database and an object model, both of which are discussed in greater detail below, that provide a simple, consistent object-oriented programming interface to the business logic contained within the LOB systems 104A-104C. FIG. 1 is a high-level architecture diagram showing the interaction between the clients 108A-108D, the LOBI stack 102, and the LOB systems 104A-104C and their respective LOB data 106A-106C.

According to embodiments, the LOB systems 104A-104C are computing systems provided by different vendors that utilize different, incompatible interfaces for accessing their respective LOB data 106A-106C. For instance, the LOB system 104A may be a database system provided by SAP, the LOB system 104B may be a database system provided by SIEBEL, and the LOB system 104C may be a custom database system. As discussed above, the LOB systems 104A-104C may comprise other types of computing systems for performing other functions.

In order to facilitate interoperability between the clients 108A-108D and the disparate LOB systems 104A-104C, the LOBI stack 102 abstracts the underlying LOB data 106A-106C and the methods for accessing the LOB data 106A-106C provided by the LOB systems 104A-104C, respectively. The LOBI stack 102 also provides a consistent, object-oriented interface to the clients 108A-108D for accessing this data. In this way, the clients 108A-108D need not be programmed to deal directly with the different interfaces exposed by the LOB systems 104A-104C. Rather, the clients 108A-108D can be programmed to access all of the LOB systems 104A-104C through a consistent interface provided by the LOBI stack 102. It should be appreciated that the clients 108A-108D may comprise virtually any type of application that consumes data, such as, but not limited to, a World Wide Web ("Web") service or Web site, a database, a desktop application program, or a server application program.

As discussed briefly above, the LOBI stack 102 provides an abstract layer that defines several artifacts of a LOB system. For instance, some or all of the following information may be defined in one embodiment: information for use in connecting to a LOB system, data defining the type of objects in the LOB system, unique identifiers for each type of object, methods to access the objects, parameters for the methods, and data types of the parameters. This layer might also provide functionality for defining method stereotypes over methods that access data from a LOB system. These stereotypes typically correspond to common operations performed on a LOB system to access data. For instance, some or all of the following stereotypical methods might be defined: a method for getting an object of a given type with a given identifier, a method for getting all objects of a particular type, a method for getting all objects of a given type related to a set of objects, and a method for getting all objects of a given type based upon a specified criteria.

These stereotypes not only provide a logical abstraction of disparate LOB APIs to the clients 108A-108D, but also make them convenient to invoke by the clients by providing default values for the fields of the API parameters. Therefore, a client 108A-108D need only provide the minimal information for use by the stereotype. According to embodiments, the stereotypes can also have "filters" associated with the fields of their parameters through which the clients can customize the API invocation by supplying custom values for the filters to thereby override default values specified for the parameters. The filtering may also be utilized to provide system-supplied values in the manner presented below.

According to embodiments, a metadata mapping language is also utilized to map LOB-specific artifacts to the abstract representation mentioned above. For instance, XML may be utilized to define a mapping according to a pre-defined schema that facilitates mapping of LOB constructs into the abstract representation. As will be described in detail below, a runtime layer is also utilized that provides a mechanism for accessing the LOB data 106A-106C in a homogeneous fashion regardless of the LOB system 104A-104C in which the data resides. The runtime layer provides entry points into the LOBI stack 102 to the clients 108A-108D for discovery of types within the LOB systems 104A-104C that have been registered with the LOBI stack 102. The runtime layer also provides functionality to permit the clients 108A-108D to invoke LOB method access objects in a homogeneous fashion. The runtime layer also provides functionality for abstracting the mechanism utilized by the LOB systems 104A-104C for batching requested LOB data from the clients 108A-108D. Additional details regarding this functionality will be provided below.

According to one embodiment, the LOBI stack 102 comprises the BUSINESS DATA CATALOG from MICROSOFT CORPORATION of Redmond, Wash. In this embodiment, the LOBI stack 102 is a MICROSOFT OFFICE SHAREPOINT SHARED SERVICE and the clients 108A-108D may comprise a business data Web part configured for use with MICROSOFT OFFICE SHAREPOINT SERVER, a SHAREPOINT list, a search component, a user profile importer, or another custom solution. It should be appreciated that while one embodiment is presented herein in the context of the BUSINESS DATA CATALOG from MICROSOFT CORPORATION, the embodiments presented herein are not so limited. Rather, the embodiments presented herein may be utilized with other LOBI stacks from other manufacturers that provide the functionality described herein for providing an interface between clients and LOB systems. Additional details regarding the functionality provided by the LOBI stack 102 are provided below.

Figure 2:
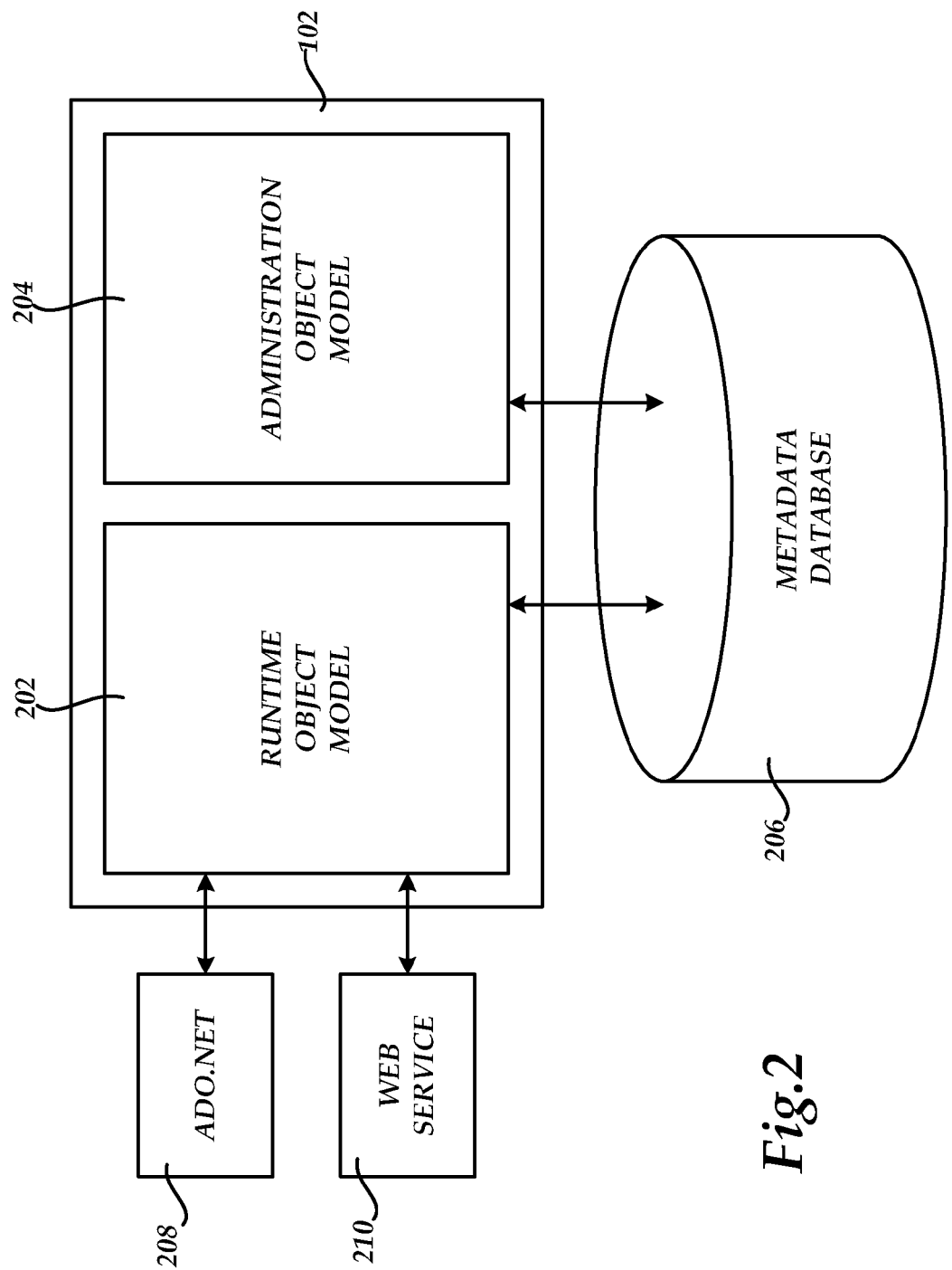

FIG. 2 is a software architecture diagram that illustrates additional aspects regarding the functionality provided by the LOBI stack 102 in one embodiment. As shown in FIG. 2, the LOBI stack 102 is configured to maintain a metadata database 206. The metadata stored in the metadata database 206 is an abstract representation of the APIs exposed by the LOB systems 104A-104C for accessing the LOB data 106A-106C. After an API description has been registered in the metadata database 206, dynamic data access connections can be made to the LOB systems 104A-104C without the need for code customized to the operation of the LOB systems 104A-104C. A metadata author may define the metadata for each data source by defining the business entities that the LOB systems interact with and the methods available in the LOB systems.

The metadata model utilized by the LOBI stack 102 to store metadata in the metadata database 206 abstracts the underlying physical sources and provides a consistent and simple model for metadata authors working with different kinds of business systems. The metadata model simplifies use of the metadata by defining semantic metadata such as entities and relationships that add meaning to the API. After the metadata is written, developers who program custom solutions using the LOBI stack 102 do not need to understand the back-end APIs utilized by the LOB systems 104A-104C, but can instead use simplified object models provided by the LOBI stack 102. This design makes it easier for both metadata authors and developers to work with the LOB systems 104A-104C, which typically have complex APIs. It should be appreciated that the LOBI stack 102 stores metadata about the LOB systems 104A-104C in the metadata database 206. The metadata database 206 does not contain actual business data.

As shown in FIG. 2, the LOBI stack 102 comprises an administration object model 204 and a runtime object model 202 in one embodiment. The administration object model 204 provides functionality for creating, reading, updating, and deleting metadata objects in the metadata database 206. Developers may utilize this functionality provided by the administration object model 204 to create and edit metadata stored in the metadata database 206.

The runtime object model 202 provides functionality for use by the clients 108A-108D. The runtime object model 202 has two major functions according to one implementation. First, the runtime object model 202 offers an intuitive, object-oriented interface to the clients 108A-108D that abstracts the underlying LOB data 106A-106C. The runtime object model 202 insulates the clients 108A-108D from application-specific coding paradigms, and allows the clients 108A-108D to access all of the LOB systems 104A-104C in a single, simplified way. Because of the functionality provided by the runtime object model 202, calling a method on a SAP system is very similar to calling a method on a SIEBEL system or executing a query in the structured query language ("SQL").

The runtime object model 202 also provides functionality for allowing the clients 108A-108D to read metadata objects from the metadata database 206 and to execute the business logic described therein. In this regard, it should be appreciated that the LOBI stack 102 does not perform the actual method execution in one embodiment. Rather, the LOBI stack 102 delegates the client invocation to an appropriate provider for the service. For instance, in the example shown in FIG. 2, an ADO.NET provider 208 is utilized to interact with database systems and a Web service provider 210 is utilized to interface with Web services. It should be appreciated that these examples are merely illustrative and that this function-ality may be provided by the LOBI stack 102 itself or other external components not shown in FIG. 2 or described herein.

Figure 3:
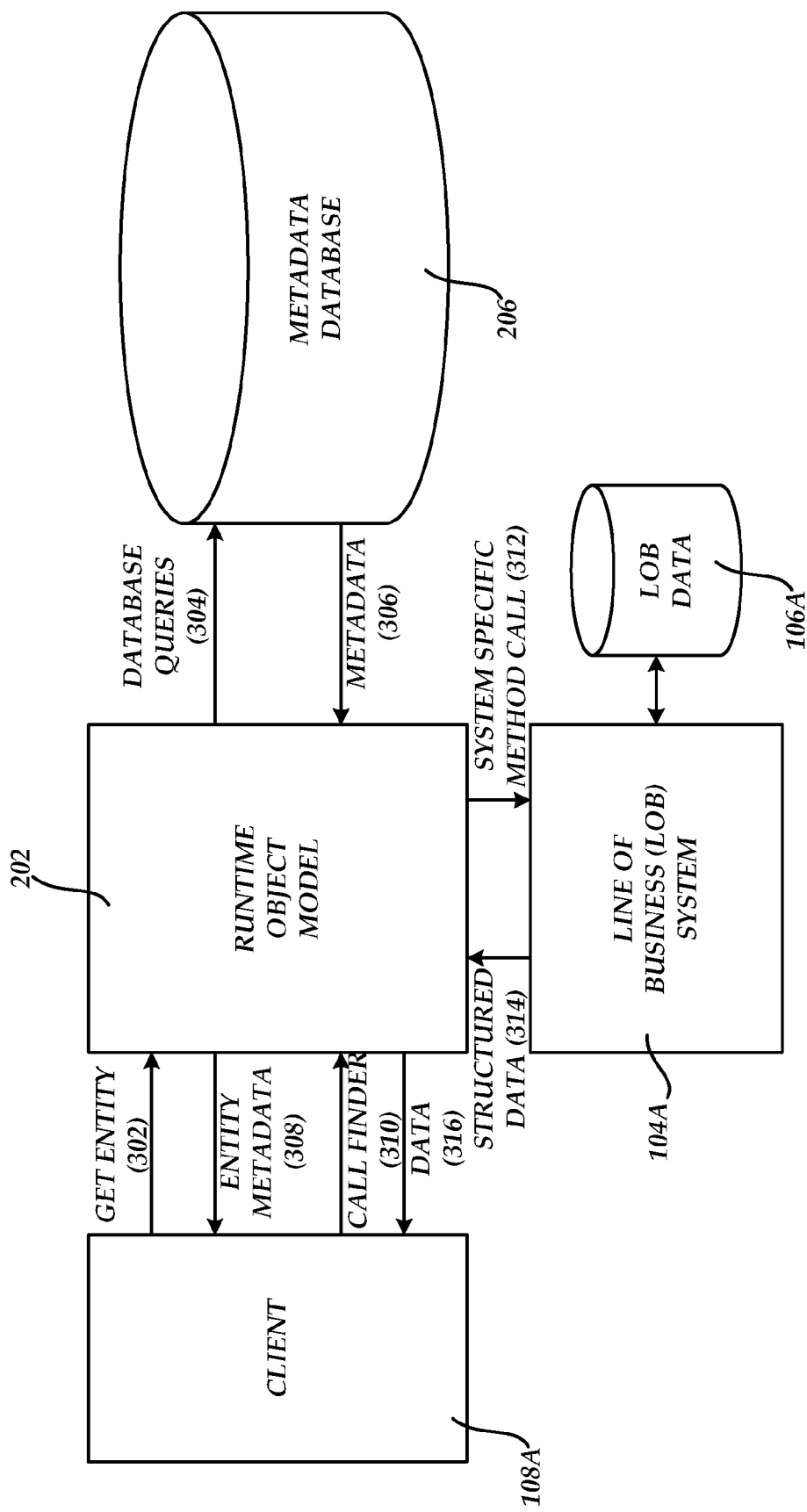

FIG. 3 is a software architecture diagram showing additional aspects of the functionality provided by the runtime object model 202 in one embodiment. In particular, FIG. 3 illustrates one process utilized by a client 108A to obtain LOB data 106A stored by the LOB system 104A. In order to obtain the data 106A, the client 108A first transmits a request to the runtime object model 202 at operation 302 to obtain information about the methods it will invoke and the parameters the LOB system 104A will accept. In response to receiving the request, the runtime object model 202 queries the metadata database 206 for the desired information at operation 304 and returns the entity metadata to the client 108A at operation 308. The entity metadata describes the fields of the entity and the methods that can be invoked (e.g., to get instances of the entity or to make changes to instances of the entity).

The client 108A uses the common interface provided by the runtime object model 202 at operation 310 to query the runtime object model 202 for the desired LOB data 106A. In response thereto, the runtime object model 202 makes system specific method calls to the LOB system 104A for the data at operation 312. In response thereto, the LOB system 104A executes the method calls to retrieve the data 106A and returns the data 106A in response to the query at operation 314. In turn, the runtime object model 202 passes the data 106A to the client 108A at operation 316 in response to the request made by the client 108A at operation 310. The client 108A may then utilize the returned data 106A in the desired manner.

As discussed briefly above, some of the APIs exposed by the LOB systems 104A-104C can return several thousand or even potentially several million records. In order to return such a large volume of data in a manageable manner, some LOB systems provide functionality for returning a large data set by returning smaller batches of the data set in multiple request/response exchanges. For instance, in one example, an API is provided by a LOB system that can be invoked repeatedly by passing a page size and a page number to the API as parameters until no data is returned. In another example, an API may be provided that takes data identifying a current batching state as input and that returns data that conveys a new batching state along with a batch of data. The pseudo code shown in TABLE 1 illustrates this type of API.

TABLE 1

```
//Sample return data packet
Struct ReturnPacket
{
Byte [ ] newBatchingState; // This can be any data type
Boolean hasMoreItems; // Flag that indicates end of batches
Item[ ] items; Actual returned data items (batch)
}
```

In yet another example, a LOB system may expose an API that takes input/output parameters that take the current batching state and that conveys the new batching state following the method execution through the input/output parameters. The pseudo code shown in TABLE 2 illustrates this type of API.

TABLE 2

Item[ ] GetAllItems (inout Byte[ ] batchingState, out Boolean hasMoreBatches);

It should be appreciated in view of the above that each of the APIs exposed by the LOB systems 104A-104C might utilize a different technique to batch large volumes of data. It should also be appreciated that, in general, LOB systems commonly utilize a set of values that flow into out of the method executing on the LOB systems 104A-104C and, potentially, an auxiliary output value that flows out of the method execution that indicates the end of batching. In this regard, TABLE 3 shows pseudo code for retrieving all of the data provided by a common LOB system API method such as this.

TABLE 3

```
Boolean hasMoreItems = true;
Byte[ ] batchingState = null;
While (hasMoreItems){
    Item[ ] items = GetAllItems ([inout] batchingState,
    [out] hasMoreItems);
    Foreach (item in items)
    {
        Yield item; //return the items of the batch to the consuming client
    }
}
```

In view of the above, it should be appreciated that the parameters that dictate the batching mechanisms utilized by the LOB systems 104A-104C are centered around logical pairs of values that flow in and out of method execution either as input/output parameters or as a mapping of an input parameter field to a field in the return parameter. As discussed above, the values provided to a method executing on the LOB systems 104A-104C are provided via one or more filters in one implementation. The filter construct discussed above is expanded in embodiments disclosed herein to accommodate the semantic coupling between pairs of values that flow into and out of the methods executing on the LOB systems 104A-104C. Through the use of this functionality, the LOBI stack 102 is configured to provide additional functionality for abstracting the batching mechanisms utilized by the LOB systems 104A-104C from the clients 108A-108D.

According to one embodiment, the filter construct type is expanded to include an input/output filter type and an output filter type in addition to plain input filter types. An input/output filter can be utilized in conjunction with fields of several input parameters and one in/out, out, or return parameter. As will be discussed in greater detail below, the LOBI stack 102 can exchange input and output values while invoking the LOB system method repeatedly to retrieve all of the requested LOB data in batches. While input/output and output filters form a base on which these streaming abstractions can be built, they are very generic semantically and could have uses outside of batching. Hence, the special purpose input/output and output filters disclosed herein for use in batching may be referred to specifically as batching and batching termination filters to more particularly describe their semantics.

In order to define the batching and batching termination filters and to associate the filters with the appropriate input parameters of the API methods exposed by the LOB systems 104A-104C, metadata is defined for use by the LOBI stack 102 and stored in the metadata database 206. A sample mapping definition for a batching API is provided below in TABLE 4 to indicate these metadata constructs.

TABLE 4

```
<Entity Name="Item">
  <Identifiers>
    <Identifier Name="Id" Type="Integer"/>
```

TABLE 4-continued

```
  </Identifiers>
  <Methods>
    <Method Name="GetAllItems">
      <Filters>
        <Filter Name="BatchingStateCookie" Type="Batching"/>
        <Filter Name="HasMoreBatches" Type="BatchingTermination"/>
      </Filters>
      <Parameters>
        <Parameter Name = "batchingState" Direction="InOut">
          <Field Name="root" Type="Byte[ ]" AssociatedFilter = "BatchingStateCookie"/>
        </Parameter>
        <Parameter Name = "hasMoreBatches" Direction="Out">
          <Field Name="root" Type="Boolean" AssociatedFilter = "BatchingTerminator"/>
        </Parameter>
        <Parameter Name = "Items" Direction="Return">
          <Field Name = "items" Type = "Item[ ]">
          .....
          </Field>
        </Parameter>
      </Parameters>
      <StereoTypes>
        <StereoType Name="ItemFetcher" Type="ItemEnumerator" ReturnParameter = "Items" ReturnField="Items"/>
      </StereoTypes>
    </Method>
  </Methods>
</Entity>
```

In the sample XML shown in TABLE 4, metadata is provided for a method exposed by a LOB system API called "GetAllItems." In this example, the <Filter> tags define the batching and batching termination filters. The <Parameter> tags associate the defined filters with the appropriate input parameters of the GetAllItems method. TABLE 5 shows another sample mapping definition for another batching mechanism utilized by an API exposed by the LOB systems 104A-104C.

TABLE 5

```
<Entity Name="Item">
  <Identitifiers>
    <Identifier Name="Id" Type="Integer"/>
  </Identifiers>
  <Methods>
    <Method Name="GetAllItems">
      <Filters>
        <Filter Name="BatchingStateCookie" Type="Batching"/>
        <Filter Name="HasMoreBatches" Type="BatchingTermination"/>
      </Filters>
      <Parameters>
        <Parameter Name = "batchingState" Direction="In">
          <Field Name="root" Type="Byte[ ]" AssociatedFilter = "BatchingStateCookie"/>
        </Parameter>
        <Parameter Name = "ReturnPacket" Direction="Return">
          <Field Name = "ReturnPacket">
            <Field Name="newBatchingState" Type="Byte[ ]" AssociatedFilter ="BatchingStateCookie" />
            <Field Name="hasMoreBatches" Type="Boolean" AssociatedFilter = "BatchingTerminator"/>
            <Field Name = "items" Type = "Item[ ]">
            .....
            </Field>
          </Field>
        </Parameter>
      </Parameters>
      <StereoTypes>
        <StereoType Name="ItemFetcher" Type="ItemEnumerator"
```

TABLE 5-continued

```
ReturnParameter =" ReturnPacket" ReturnField="Items"/>
        </StereoTypes>
      </Method>
    </Methods>
</Entity>
```

In the sample XML shown in TABLE 5, metadata is provided for a method exposed by a LOB system API called "GetAllItems" that batches data in a different manner than in the example shown in TABLE 4. As in the example shown in TABLE 4, the <Filter> tags define the batching and batching termination filters. The <Parameter> tags also associate the defined filters with the appropriate input parameters of the GetAllItems method. However, in this example, the batching state and the batching terminator are defined as fields within a return packet.

It should be appreciated that the schema set forth above in TABLES 4 and 5 is merely illustrative and that other schema might be utilized to define the filters and to associate the filters with parameters on an API exposed by a LOB system. It should also be appreciated that through the use of this schema, many types of batching mechanisms might be defined and mapped to filters on the LOBI stack 102.

Figure 4:
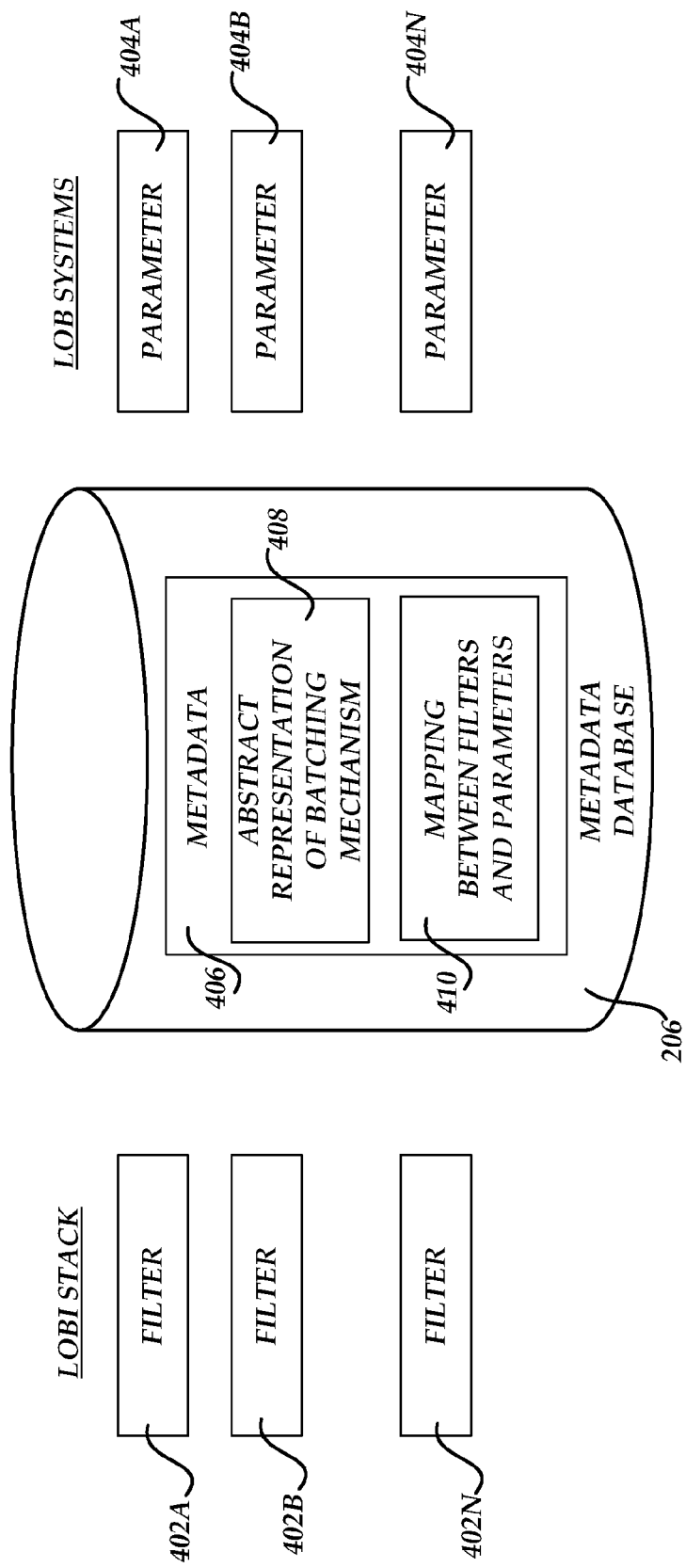
FIG. 4 is a software architecture diagram showing aspects of metadata for abstractly defining a batching mechanism utilized by a LOB system in one embodiment presented herein.

FIG. 4 graphically illustrates one process for abstracting the batching mechanisms utilized by the LOB systems 104A-104C and mapping the parameters utilized by the mechanisms to filters within the LOB stack 102. In particular, as shown in FIG. 4, metadata 406 is stored in the metadata database 206 that includes the abstract representation 408 of the batching mechanisms utilized by the LOB systems 104A-104C. For instance, the abstract representation 408 might include metadata that identifies and describes the parameters 404A-404N that the APIs exposed by the LOB systems 104A-104C take. The metadata 406 also includes a mapping 410 between the filters 402A-402N utilized by the LOBI stack 102 and the parameters 404A-404N. As discussed above, the XML shown in TABLES 4 and 5 are several examples of the metadata 406 that is utilized by the LOBI stack 102 in one embodiment presented herein.

Figure 5:
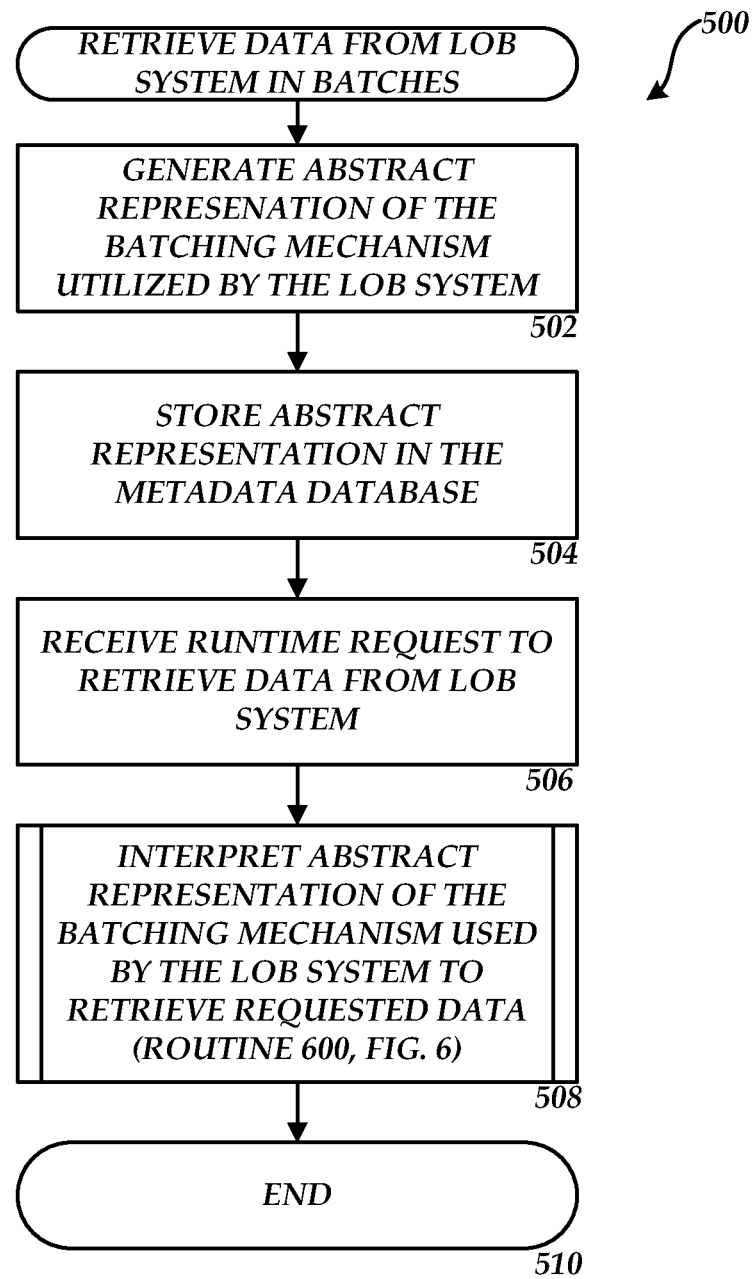
FIGS. 5-6 are flow diagrams illustrating aspects of one process provided herein in one embodiment for retrieving data in batches from LOB systems.

Referring now to FIG. 5, additional details will be provided regarding the embodiments presented herein for batching data from LOB systems. In particular, FIG. 5 is a flow diagram illustrating aspects of the operation of the LOBI stack 102 for batching data from the LOB systems 104A-104C. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the abstract representation 408 of the batching mechanisms utilized by the LOB systems 104A-104C is generated. Once the abstract representation 408 has been generated, it is stored in the metadata database 206 at operation 504. From operation 504, the routine 500 proceeds to operation 506, where a runtime request is received from one of the clients 108A-108D for LOB data 106A-106C available from one of the LOB systems 104A-104C. In response to receiving such a request, the routine 500 proceeds to operation 508, where the LOBI stack 102 interprets the abstract representation 408 to retrieve the requested LOB data 106A-106C in batches. An illustrative routine 600 is described below that illustrates this process in greater detail. From operation 508, the routine 500 proceeds to operation 510, where it ends.

Figure 6:
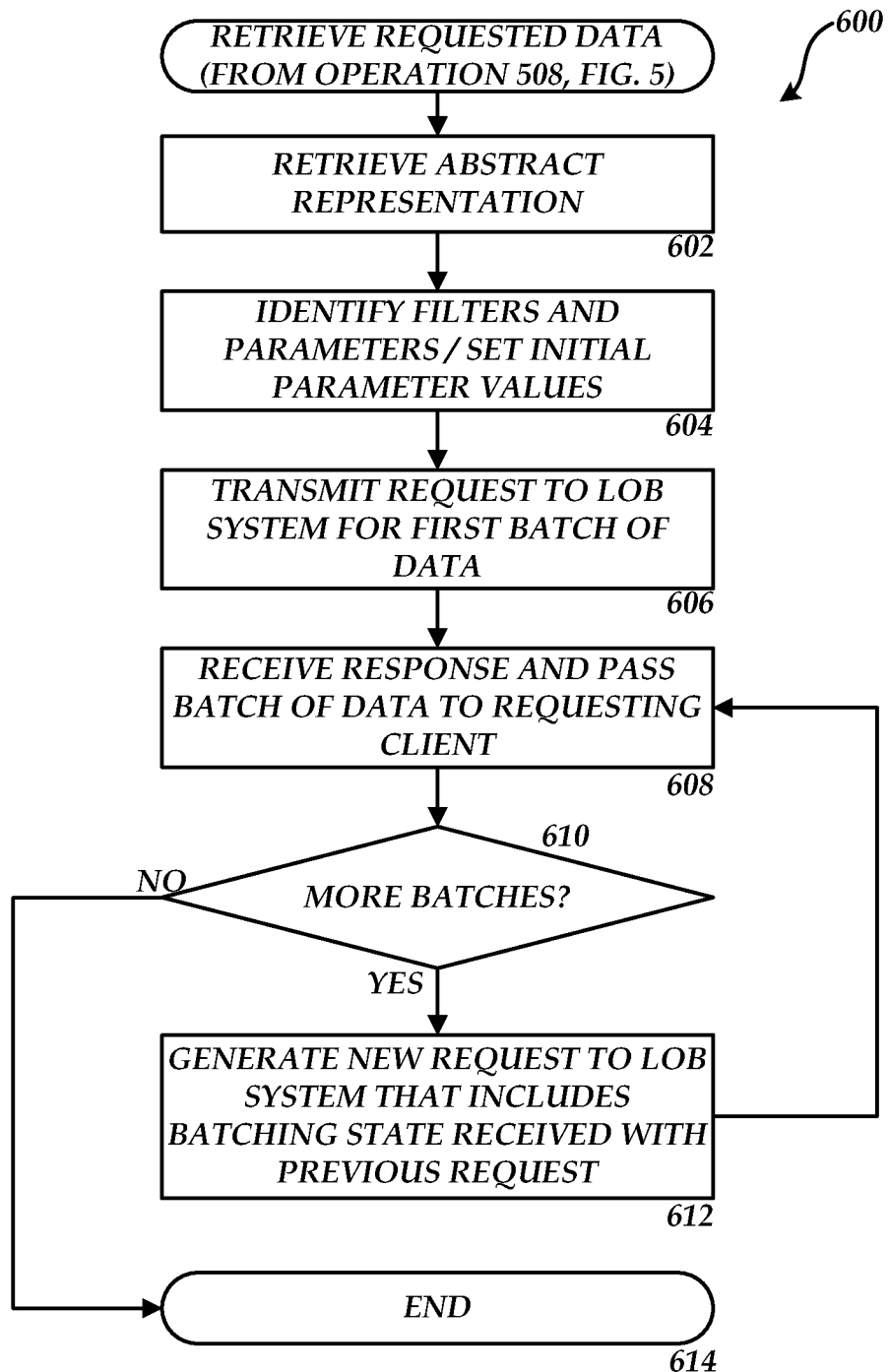

FIG. 6 shows one illustrative routine 600 utilized by the LOBI stack 102 in one embodiment to retrieve data from one of the LOB systems 104A-104C in batches. The routine 600 begins at operation 602, where the LOBI stack 102 retrieves the metadata 406, including the abstract representation 408 and the mapping 410, for the particular LOB system 104A-104C from which the LOB data 106A-106C is to be retrieved. Once the metadata 406 has been retrieved, the routine 600 proceeds to operation 604, where the LOBI stack 102 identifies the filters 402A-402N and the parameters 404A-404N for use in requesting data from the LOB system. Using this information, the LOBI stack 102 generates an initial request for the LOB data, including any initial parameters expected by the LOB system 104A-104C.

From operation 604, the routine 600 proceeds to operation 606, where the LOBI stack 102 transmits the initial request to the LOB system for the requested LOB data. At operation 608, the LOBI stack 102 receives a reply to the request that includes the first batch of data and any return parameters that indicate whether batching has been completed and the current batching state. From operation 608, the routine 600 proceeds to operation 610, where the LOBI stack 102 determines whether additional batches of data remain to be retrieved from the LOB system. This determination is made based upon one or more of the parameters returned from the LOB system.

If no additional batches of data remain to be retrieved, the routine 600 proceeds from operation 610 to operation 614, where it ends. If, however, additional batches of data remain to be retrieved, the routine 600 proceeds to operation 612, where the LOBI stack 102 generates a new request to the LOB system for the next batch of data. The new request includes the batching state received with the previous batch of data. The routine 600 then returns to operation 608, where an additional batch of data is received. This process is repeated until all of the available batches of data have been received from the LOB system. It should be appreciated that the operations shown in FIG. 6 may be performed in a different manner, and that fewer or additional operations may be performed, depending upon the particular batching mechanism utilized by the LOB system. It should also be appreciated that the LOBI stack 102 may stream data to the requesting client. Alternately, the requesting client 108A-108D may provide instructions to the LOBI stack 102 as to how the data is to be returned.

Figure 7:
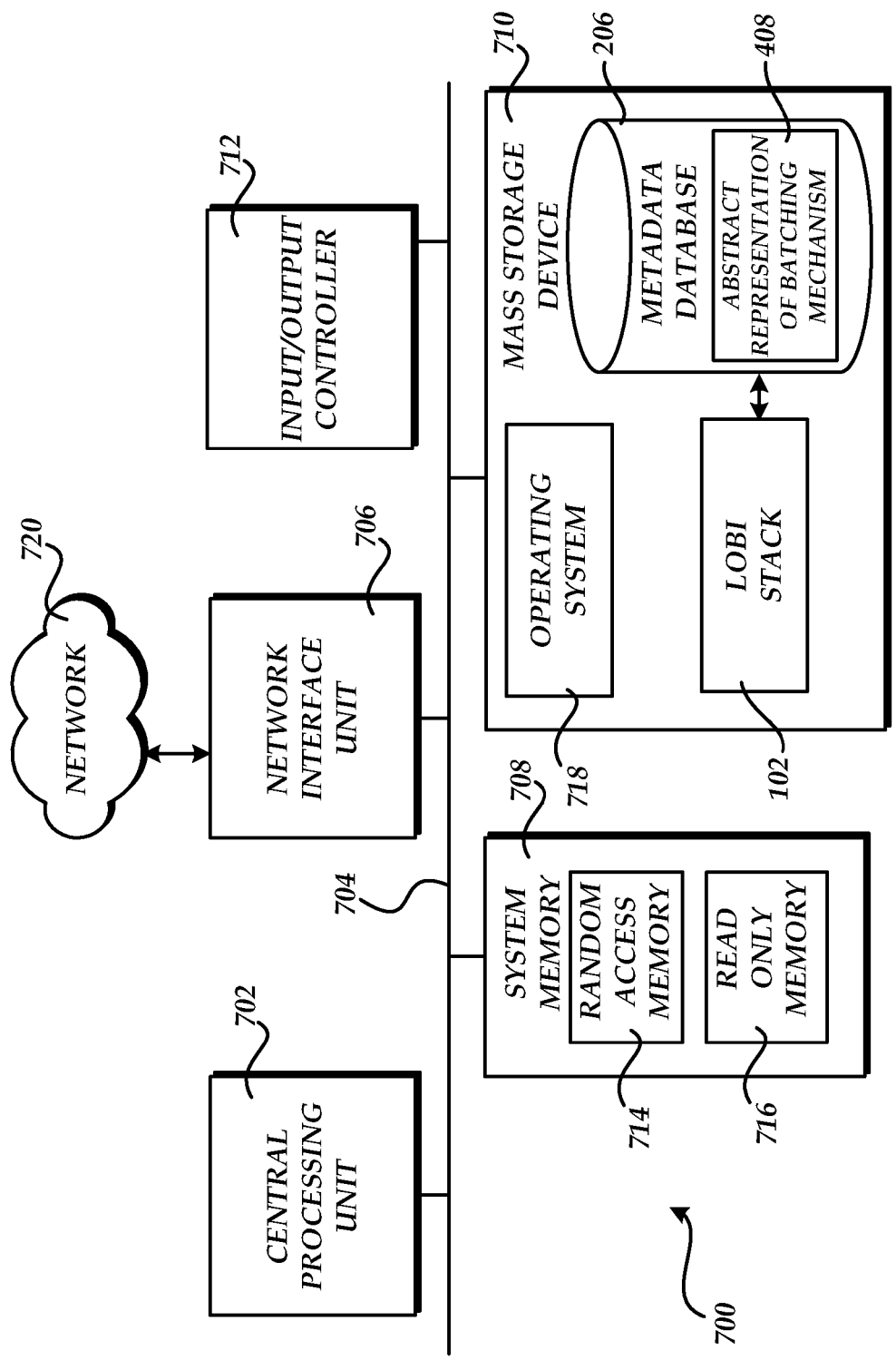
FIG. 7 is a computer architecture diagram showing an illustrative computer hardware and software architecture for a computing system capable of implementing aspects of the embodiments presented herein.

FIG. 7 shows an illustrative computer architecture for a computer 700 capable of executing the software components described herein for batching data from the LOB systems 104A-104C in the manner presented above. The computer architecture shown in FIG. 5 illustrates a conventional desktop, laptop, or server computer and may be utilized to implement the clients 108A-108D, a computing system for executing the LOBI stack 102, and the LOB systems 104A-104C.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 720. The computer 700 may connect to the network 720 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store the LOBI stack 102, the metadata database 206, and the abstract representation of the batching mechanisms 308, each of which was described in detail above with respect to FIGS. 1-6. The mass storage device 710 and the RAM 714 may also store other types of program modules and data.

It should be appreciated that the software components described herein may, when loaded into the CPU 702 and executed, transform the CPU 702 and the overall computer 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the computer 700 may comprise other types of computing devices, including hand-held computers, embedded computer systems, personal digital assistants, and other types of computing devices known to those skilled in the art. It is also contemplated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for retrieving data in batches from a LOB system are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage device having computer-executable instructions stored thereon for execution by an interface computer system, the computer-readable instructions comprising:
   a program module configured to:
   store an abstract representation of a mechanism that interfaces with a plurality of line of business (LOB) computing systems to return requested data in a plurality of batches, wherein the abstract representation of the mechanism comprises parameter metadata that defines at least one parameter utilized by the at least one of the plurality of LOB computing systems, filter metadata that defines at least one filter, and mapping metadata that defines a mapping between the at least one filter and the least one parameter, and wherein at least two of the plurality of computing systems utilize different interfaces;
   receive a request from a client for the data from at least one of the plurality of LOB computing systems;
   in response to receiving the request, utilize the abstract representation to identify the at least one parameter and utilize the at least one parameter to create a request to retrieve the requested data from the at least one of the LOB computing systems in the plurality of batches; and
   provide the requested data to the client in response to the request, the program module comprising an administrative object model for creating or editing the abstract representation utilized by the plurality of LOB computing systems.

2. The computer-readable storage device of claim 1, wherein the program module comprises a line of business data integration (LOBI) stack.

3. The computer-readable storage device of claim 2, wherein the at least one filter is utilized by the LOBI stack.

4. The computer-readable storage device of claim 1, wherein the data comprises LOB data.

5. The computer-readable storage device of claim 1, wherein utilizing the abstract representation to identify the at least one parameter and utilize the at least one parameter to create a request to retrieve the requested data from the at least one of the LOB computing systems in the plurality of batches comprises:
   retrieving the abstract representation; identifying the at least one parameter based upon the abstract representation; and
   utilizing the at least one parameter to create a request to the computing system for a first batch of data of the plurality of batches.

6. The computer-readable storage device of claim 5, wherein utilizing the abstract representation to identify the at least one parameter and utilize the at least one parameter to create a request to retrieve the requested data from the at least one of the plurality of LOB computing systems in the plurality of batches further comprises:
   receiving a response to the request from the at least one of the plurality of LOB computing systems, the response comprising the first batch of data and one or more return parameters;
   determining based upon the return parameters whether additional batches of the plurality of batches are available from the at least one of the plurality of LOB computing systems; and
   if additional batches are available, creating a new request to the at least one of the plurality of LOB computing systems for an additional batch of data, the new request comprising a batching state received with a previous batch of data.

7. The computer-readable storage device of claim 6, wherein utilizing the abstract representation to retrieve the requested data from the at least one of the plurality of LOB computing systems in the plurality of batches further comprises providing one or more batches of data to the client, whereby the batching operation of the at least one of the plurality of LOB computing systems is abstracted from the client.

8. The computer-readable storage device of claim 1, wherein a first one of the plurality of LOB computing systems is provided by a first vendor and wherein a second one of the plurality of LOB computing systems is provided by a second vendor.

9. A method for retrieving data from an interface computing system in batches, the method comprising:
   storing an abstract representation of a mechanism that interfaces with a plurality of line of business (LOB) computing systems to return data in a plurality of batches, wherein the abstract representation of the mechanism comprises parameter metadata that defines at least one parameter utilized by the at least one of the plurality of LOB computing systems, filter metadata that defines at least one filter, and mapping metadata that defines a mapping between the at least one filter and the least one parameter, and wherein at least two of the plurality of LOB computing systems utilize different interfaces, and further wherein the abstract representation is created or edited using an administrative object model associated with the abstract representation;
   receiving a request from a client for the data; and
   in response to receiving the request, utilizing the abstract representation to identify the at least one parameter and utilize the at least one parameter to create a request to retrieve the requested data from at least one of the plurality of LOB computing systems in the plurality of batches and providing the requested data to the client.

10. The method of claim 9, wherein the storing, receiving, and utilizing operations are performed by a LOBI stack.

11. The method of claim 10, wherein the at least one filter is utilized by the LOBI stack.

12. The method of claim 9, wherein the data comprises LOB data.

13. The method of claim 9, wherein utilizing the abstract representation to identify the at least one parameter and utilize the at least one parameter to create a request to retrieve the requested data from the at least one of the plurality of LOB computing systems in the plurality of batches comprises:
   retrieving the abstract representation;
   identifying the at least one parameter based upon the abstract representation; and
   utilizing the at least one parameter to create a request to the at least one of the plurality of LOB computing systems for a first batch of data of the plurality batches.

14. The method of claim 13, wherein utilizing the abstract representation to identify the at least one parameter and utilize the at least one parameter to create a request to retrieve the requested data from the at least one of the plurality of LOB computing systems in the plurality of batches further comprises:
   receiving a response to the request from the computing system, the response comprising the first batch of data and one or more return parameters;

determining based upon the return parameters whether additional batches of the plurality of batches are available from the computing system; and if additional batches are available, creating a new request to the at least one of the plurality of LOB computing systems for an additional batch of data, the new request comprising a batching state received with a previous batch of data.

15. The method of claim 9, wherein a first one of the plurality of LOB computing systems is provided by a first vendor and wherein a second one of the plurality of LOB computing systems is provided by a second vendor.

16. A system comprising:
one or more processors; and
a memory coupled to the one or more processors, the memory for storing instructions which, when executed by the one or more processors, cause the one or more processors to retrieve data from one or more line of business (LOB) systems in batches, the system further comprising:
a line of business data integration (LOBI) stack comprising an abstract representation of a batching mechanism that interfaces with a plurality of LOB systems, wherein at least two of the plurality of LOB systems utilize different interfaces, and wherein the abstract representation comprises parameter metadata that defines one or more parameters utilized by the plurality of LOB systems to return requested LOB data in a plurality of batches;
one or more filters utilized by the LOBI stack;
metadata defining a mapping between the filters and the parameters, the LOBI stack further configured to receive a request from a client for the LOB data; and
in response to receiving the request, to utilize the abstract representation to identify the one or more parameters and utilize the at least one parameter to create a request to retrieve the requested LOB data from at least one of the plurality of LOB systems in the plurality of batches and to provide the requested LOB data to the client in response to the request, wherein the LOBI stack further comprises an administrative object model for creating or editing the abstract representation used by the plurality of LOB systems.

17. The system of claim 16, wherein a first one of the plurality of LOB systems is provided by a first vendor and wherein a second one of the plurality of LOB computing systems is provided by a second vendor.

18. The system of claim 16, wherein utilizing the abstract representation to identify the at least one parameter and utilize the at least one parameter to create a request to retrieve the requested LOB data from the at least one of the LOB systems in the plurality of batches comprises:
retrieving the abstract representation;
identifying the one or more parameters based upon the abstract representation; and
utilizing the one or more parameters to create a request to the computing system for a first batch of LOB data of the plurality of batches.

19. The system of claim 18, wherein utilizing the abstract representation to identify the at least one parameter and utilize the at least one parameter to create a request to retrieve the requested LOB data from the at least one of the LOB systems in the plurality of batches further comprises:
receiving a response to the request from at least one of the plurality of LOB systems, the response comprising the first batch of LOB data and one or more return parameters;
determining, based upon the return parameters, whether additional batches of the plurality of batches are available from the at least one of the plurality of LOB systems; and
if additional batches are available, creating a new request to the at least one of the plurality of LOB systems for an additional batch of LOB data, the new request comprising a batching state received with a previous batch of LOB data.

20. The system of claim 19, wherein providing the requested LOB data to the client comprises providing one or more batches of LOB data to the client, whereby the batching operation of the at least one of the plurality of LOB systems is abstracted from the client.

* * * * *